United States Patent [19]

Eickmann

[11] Patent Number: 4,557,347

[45] Date of Patent: Dec. 10, 1985

[54] FLUID PUMPS, FLUID MOTORS AND DEVICES, WHEREIN THEY ARE APPLIED

[76] Inventor: Karl Eickmann, 2420 Isshiki, Hayama-machi, Kanagawa-ken, Japan

[21] Appl. No.: 282,990

[22] Filed: Jul. 14, 1981

[51] Int. Cl.[4] ................................................ B60K 7/00
[52] U.S. Cl. ..................................... 180/308; 280/698
[58] Field of Search ............... 180/308, 242, 243; 280/43.23, 698, 701

[56] References Cited

U.S. PATENT DOCUMENTS

| 2,558,562 | 6/1951 | Hutton | 180/308 |
|---|---|---|---|
| 3,223,046 | 12/1965 | Eickmann | 92/58 |
| 3,532,354 | 10/1970 | Fulmer | 280/43.23 |
| 3,613,845 | 10/1971 | Hollander | 280/43.23 |
| 3,700,057 | 10/1972 | Boyd | 180/308 |
| 3,762,488 | 10/1973 | Dammon | 180/308 |
| 3,831,496 | 8/1974 | Eickmann | 91/487 |
| 3,850,201 | 11/1974 | Eickmann | 137/625.21 |
| 3,874,271 | 4/1975 | Eickmann | 91/491 |
| 3,913,454 | 10/1975 | Nelson | 180/308 |
| 3,932,076 | 1/1976 | Thibault | 180/308 |
| 3,951,044 | 4/1976 | Eickmann | 91/485 |
| 3,977,302 | 8/1976 | Eickmann | 91/492 |
| 4,050,707 | 9/1977 | Glumac | 280/43.23 |
| 4,205,497 | 5/1981 | Eickmann | 306/215 |

Primary Examiner—David M. Mitchell

[57] ABSTRACT

In a fluid pump or motor improvements are provided to the piston shoes therein to permit a higher pressure in the respective device. Other improvements are done to the hydrostatic bearings in radial piston or radial chamber type fluid motors and pumps. A further arrangement is, that plural pistons are applied to permit the use of two different fluids in the respective device. This leads also to the application of disc springs and their modification in a pump or motor to make the pumping of non-viscous fluids like water possible at very high pressure. Motors are provided with arrangements to permit them to drive and to carry simultaneously or to have hollow shafts, whereby improved and novel machines and vehicles are obtained.

2 Claims, 34 Drawing Figures

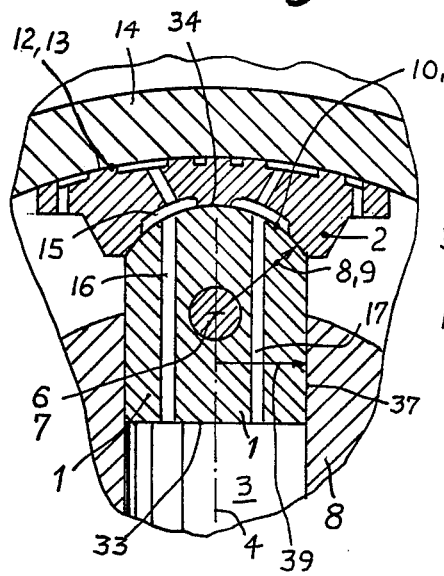
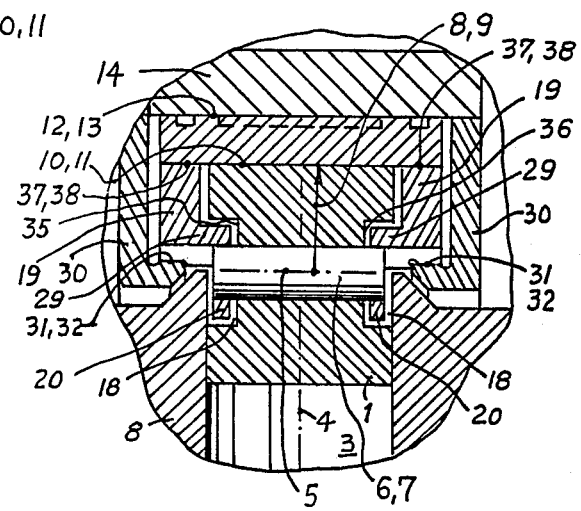
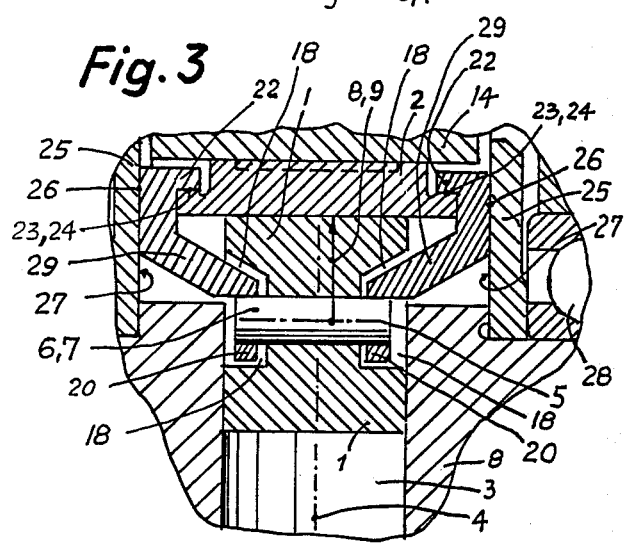

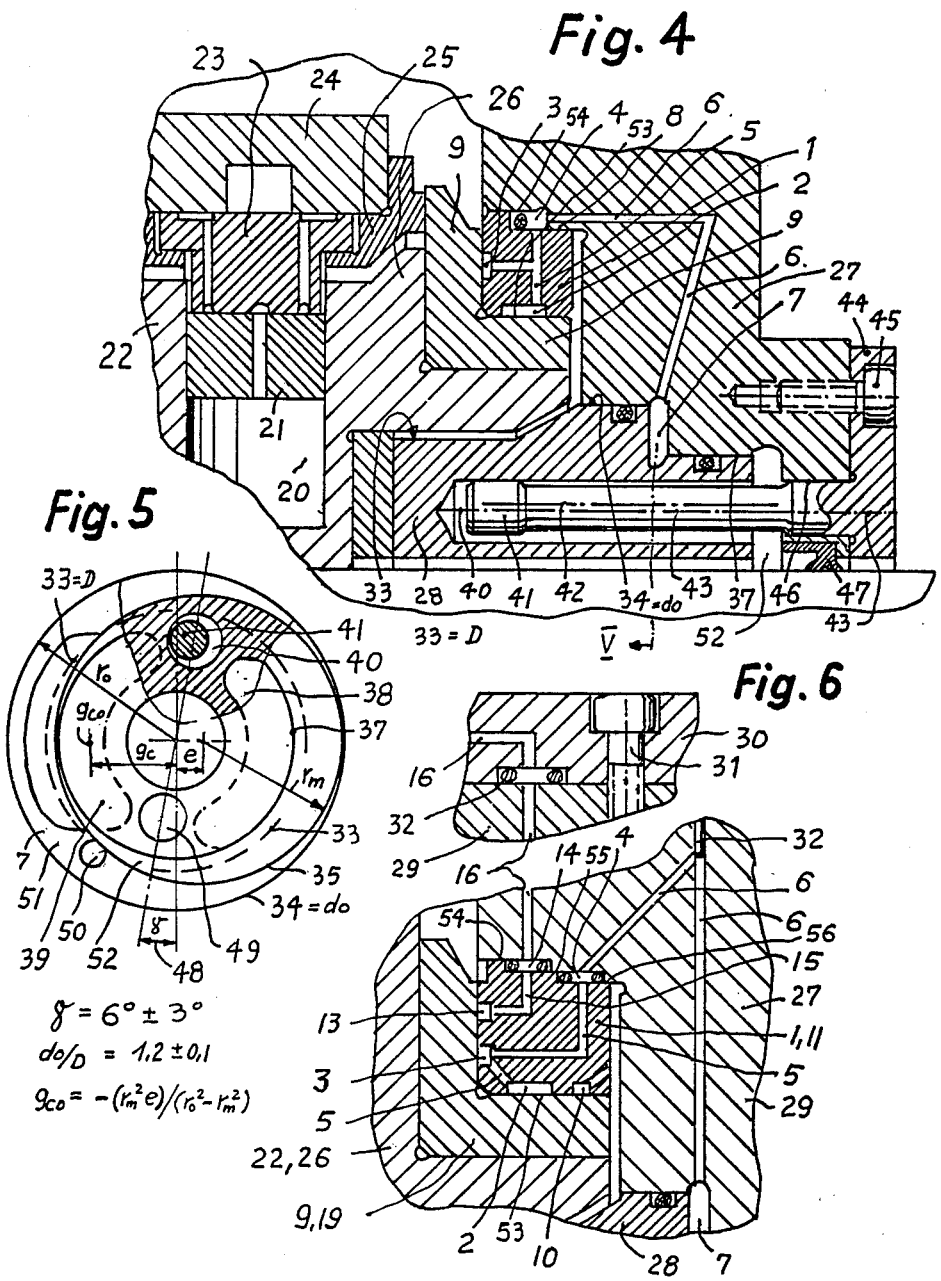

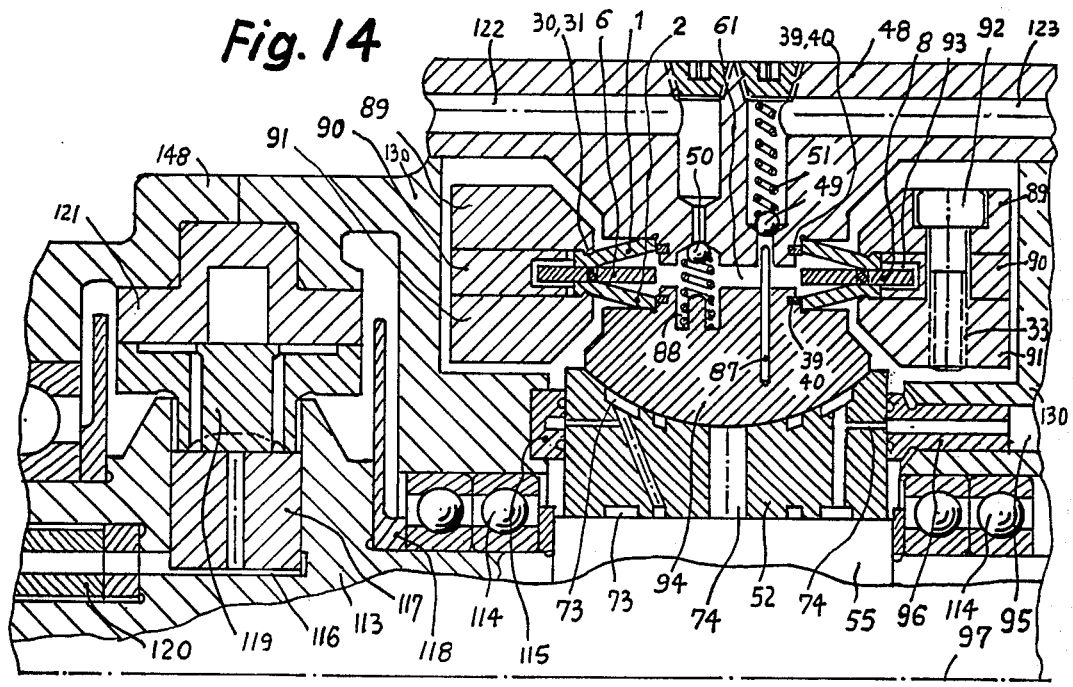
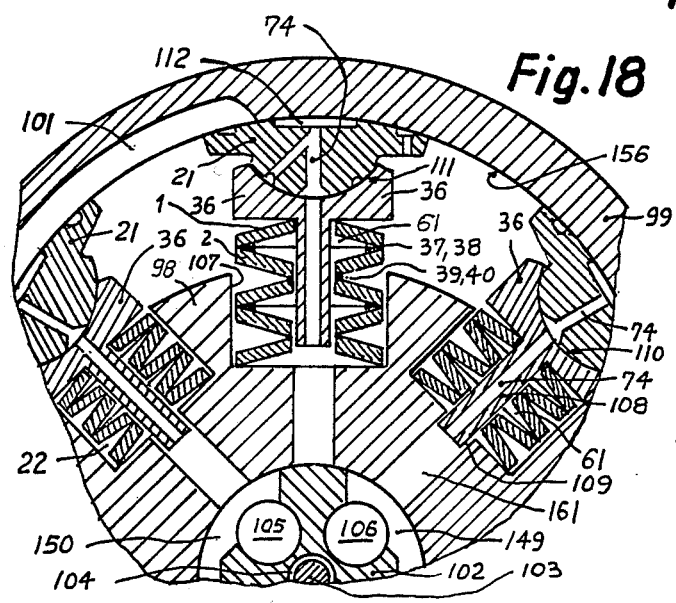
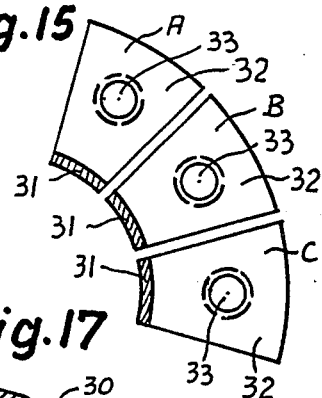
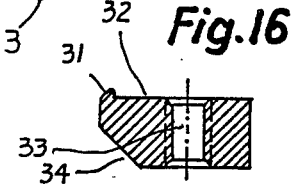

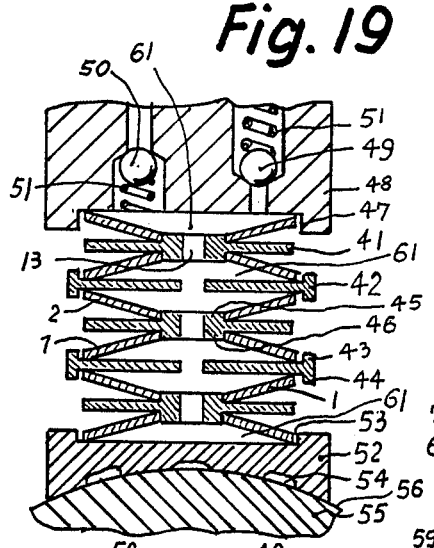
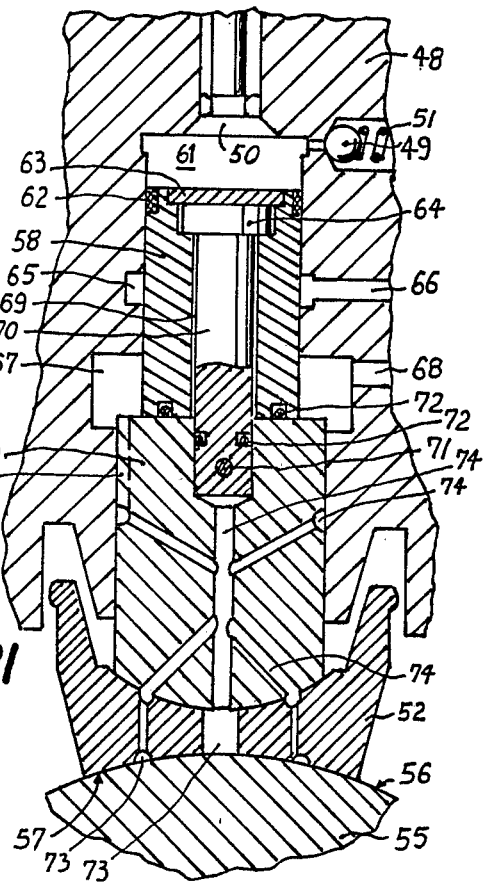
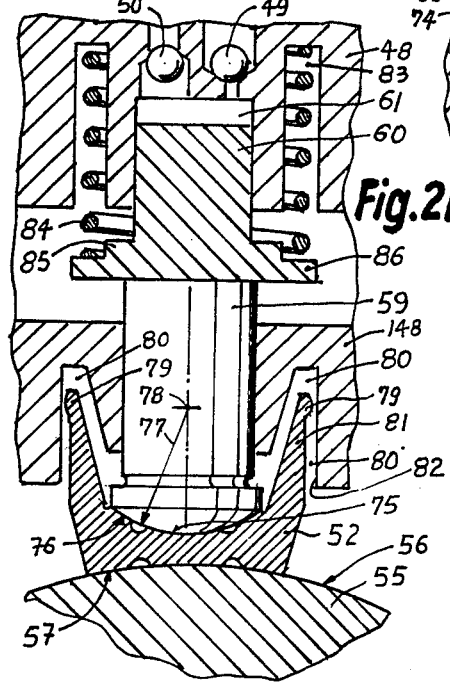
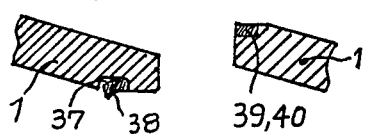
Fig. 19  Fig. 20  Fig. 21  Fig. 22  Fig. 23

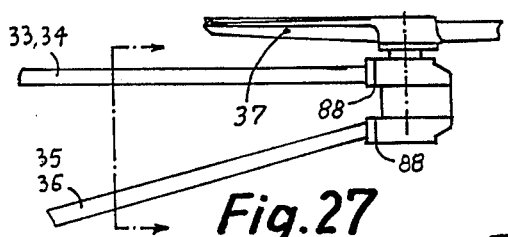
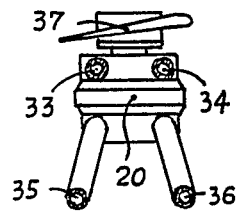
Fig.27　Fig.28
Fig.29　Fig.30
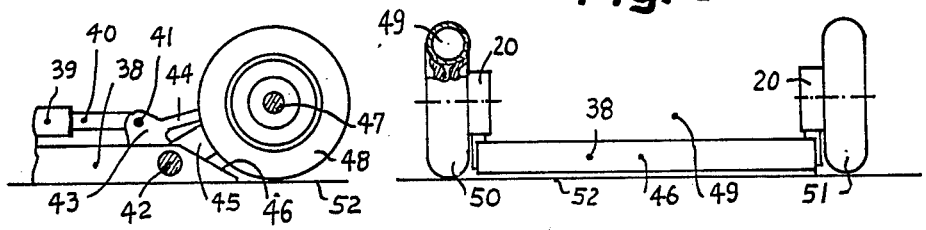
Fig.31
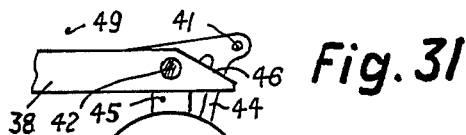
Fig.32
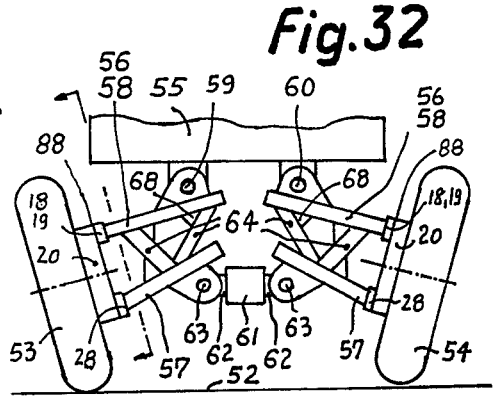
Fig.33
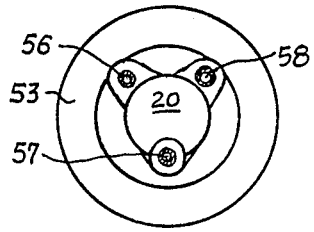

FLUID PUMPS, FLUID MOTORS AND DEVICES, WHEREIN THEY ARE APPLIED

BACKGROUND OF THE INVENTION (a) Field of the Invention

This invention relates to hydrostatic or pneumatic fluid pumps or motors and to devices, like machines and vehicles, wherein the respective pumps or motors are applied. Improvements are made to a piston and piston-shoe assembly to improve the range of pressure in the device economically. Other improvements are made to hydrostatic bearing applications and their communications to spaces under pressure. This is done for hydrostatic bearings on the ends of the rotor(s) as well as to a hydrostatic bearing in the middle between two respective rotors. Consideration is also given to the problem, that some fluids do not have good lubrication properties, like for example, water. Therefore disc-spring modifications have been applied in order to make a pump or motor possible without a closely fitted piston which might weld in a cylinder when operating non-lubricating fluid. Finally improvements have done in the directions and configurations of the ports as well as in the bearings of fluid motors to permit a radial-chamber fluid motor to drive a rotary movement and at the same time to carry a load, whereby several new and useful machines and vehicles are possible by the application of the hollow shaft motor or of the drive and carry motor of the invention.

(b) Description of the Prior Art

The prior art which is partially related to this present patent application is shown for example in my U.S. Pat. Nos. 3,850,201; 3,951,044; 3,874,271; 3,223,046; 4,265,497 or others and also in my co-pending application Ser. Nos. 910,809; 911,246 and 224,769, all now abandoned. The content of application Ser. Nos. 910,809 and 911,246 was published in the West German DOS No. 2,921,765 on Feb. 2, 1980.

The former art shows piston shoes, which are entering, diving, deep diving piston shoes to obtain long piston strokes or the piston shoes of the former art are outer piston shoes which are assumed to carry a high radial load to permit high pressures in the devices.

The former art also does attempt to provide hydrostatic bearings or support bearings on the rotors of the pump or motors.

The former art also shows control bodies which are responsive to partially eccentric thrust chambers.

While the devices of the described former art act generally satisfactory at certain pressures and rotary revolutions, there are appearing presently limitations, when the devices of the former art are tested in conditions with still higher pressures or revolutions. Problems are also arising, when not very lubricatious fluids are used in the pumps and motors. For example, when water is used instead of oil, the pistons in the respective cylinders are tending to wear and stick. The same applies to piston shoes of the former art, when they are applied in water pumps or water operated motors.

The hydrostatic bearings of the former art are heretofore applied to act for certain purposes. In present more general applications however, it appears, that the failure to employ all and the right fluid pressure pockets and communications are limiting their use.

And the fluid motors of the former art are commonly unable to permit a hollow shaft with a large enough a diamter to permit the setting of strong machine tool spindles into the respective rotor. The motors of the former art are also failing to permit at the same time the operation of multi—functions, like for example, to drive the rotary movement of an element and to carry the element or a load thereon. They are also failing to be carried by such element and then carry a load themselves.

SUMMARY OF THE INVENTION

The aim of the invention is, to overcome at least partially the limitations of the former art and thereby to improve the devices of the former art as well as to provide novel and useful pumps, motors, machine tools, devices or vehicles, which apply such novel pumps or motors.

It is therefore an object of the invention to provide a piston-piston shoe assembly in a radial piston device, which is able to carry a high radial load and thereby to operate the device with high pressure, while at the same time a portion of the assembly is capable of temporarily entering into the cylinder of the device in order to obtain a relatively long piston stroke.

Another object of the invention is, to prevent the pivoting and sticking of a control body.

A further object of the invention is, to apply a hydrostatic bearing to a housing and a rotor of the device, whereby the bearing builds axially short and carries either a radial load or a radial and an axial load, while it is communicated to a respective space with fluid under pressure.

In a still further object of the invention, the bearing is communicated to a thrust chamber between two seats of a thrust- and control-body.

Still another object of the invention is, to provide to a medial rotor bearing the respective suitable communications, to place the thrust chambers and pistons thereof onto a correct radius "rgc"; to provide correct diameters to the thrust chambers and pistons therein, and also to provide a second axial bearing and communications to a rotor on the other end of the device in order to permit two different pressures in a device with a medial rotor bearing between two rotors and axial thrust provisons in the inner portion of the mdeial rotor bearing.

A still other object of the invention is, to depart the axis of a stroke guide actuator in two different dimensions away from the axes of the rotor and of the control body to increase the smoothness of operation of a pump or motor.

An important object of the invention is also, to provide a pump or motor without pistons which fit closely in cylinders, wherein they are reciprocating, in order to make it possible to use a fluid with little or no capability to lubricate the fitting and moving surfaces, like for example, water.

An object in this connection is also, to use disc-springs to form a pumping or motoring chamber and to compress the chamber by a respective thrust piston.

A still further object of the invention is, to modify the common disc to be able to fulfill the object of using it in or on or to form a pumping or motoring fluid handling chamber.

Still an other object of the invention is, to provide dead space fillers or dead space preventers to disc-spring pumping or motoring chambers.

A further object of the invention is, to provide centering portions or centering bodies to a disc spring assembly.

Another object of the invention is, to provide a simple pump or motor with no fitting pistons or cylinders and to operate the device exclusively by a disc-spring assembly with a piston shoe and a guide face for the piston shoes, whereby the pump becomes very inexpensive and so the motor.

A further object of the invention is, to provide seal means onto a respective tapered disc spring to make a simple application as pumping or motoring chamber possible.

A still other important object of the invention is, to provide a super-critical pressure stage in a pump or motor, wherein the pumping or motor chambers are built by at least one disc spring and the super-critical range permits extremely high pressures by clamping the radial outer end of the respective disc-spring to prevent an opening of a disc-spring pumping or motoring chamber under high fluid pressure in the respective chamber.

Due to an object of the invention, related to the last object herebefore is, to divide the clamping ring assembly into sections and to provide grooves and into the grooves entering portions on the sections or disc springs in order to prevent escape of the clamping sections from the outer ends of the respective disc spring.

A still other object of the invention is, to provide a tapered disc spring of strong, but glueable material, as for example, carbon fibre and to glue a plurality of disc springs of this type together by respective adhesive material as for example epoxy resin.

According to a further object of the invention, the water pump of disc spring pumping chambers is driven by a hydrostatic motor with a speed range of rotary velocity, suitable to permit a long life of the disc shape pumping or motoring chamber.

In an other object of the invention, suitable means are provided to drive the disc-spring compression by a respective piston and piston shoe, whereby the faces between the piston and shoe are lubricated by a suitable fluid, for example, by oil, and wherein suitable fluid supply means and communications are provided.

A still further object of the invention deals with arrangements to operate two different fluids.

Therein two different pistons may become connected by suitable arrangement in accordance with a respective object of the invention, to move both pistons in unison.

An object of the invention provides a thrust chamber around the respective ends of the two pistons and different diameters to the pistons, whereby the pressure in fluid in the thrust chamber drives the pistons in a respective outward stroke., while in a still further pbject of the invention, a dirty-fluid collection chamber and dirty-fluid exit passage is provided to prevent a mixing and dirtying of two separated and different fluids in the respective pump or motor.

Another object of the invention is, to set radially distanced from the wall of the cylinder wherein a first piston operates, a ring-groove with a spring therein and to provide a spring bearing and a spring seat on one end of the respective piston to move the respective piston by the expansion force of the spring in an outward stroke.

A further object of the invention is, to provide a housing and strong bearings therein together with a fluid motor of a radial chamber type in order to apply a spindle into the rotor, whereby the spindle is capable of machine tool or respective work, when it is revolved by the mentioned fluid motor.

In a further object of the invention, related thereto, the spindle or shaft is axially moveable in the bearings and in the rotor of the motor and provided with respective seats or holding portions in order to make the application of an axial drive arrangement or thrust and retraction arrangement possible on said shaft to operate the shaft or spindle automatically for rotary movement at work and at the same time to adjust or automatically adjust and stop the axial penetration of the respective spindle.

An other object of the invention provides a hollow shaft motor in order that a shaft or spindle might be inserted into the hollow portion of the motor or in order that the motor may be mounted respectively over a respective shaft or spindle of a device, machine or vehicle.

Still an other object of the invention is, to provide a "drive- and carry-motor" which has strong bearings in order to be able to carry a load in addition to the load in the rotor of the motor and which has ports which are directed in a single dimension with end faces perpendicular to the ports, whereby the motor obtains mounting plane faces whereinto the entrance and/or exit ports are porting in order to obtain an easy assembly of the motor onto a respective load, element, device, machine or vehicle at small space and weight, as well as cost.

Due to a further object of the invention, the drive and carry motor is applied in a truck or car and provided with a pivot arrangement to drive the wheels of the vehicle and to lower and lift the wheels or the body of the vehicle for easy loading of the vehicle and for smooth travel of the vehicle alternatively.

And, a still other object of the invention is, to provide a swing axis assembly with a structure and fluid motors to drive the wheels of the vehicle, wherein the device drives the wheels and at the same time acts as a shock-reducer;

while other objects of the invention are, to apply the drive and carry motor onto respective devices, machines or vehicles.

BRIEF DESCRIPTION OF THE DRAWINGS

FIG. 1 is a longitudinal sectional view through an embodiment of a piston and piston shoe assembly of the invention.

FIG. 2 is a cross-sectional view through FIG. 1 along the medial face and axis 4 of FIG. 1.

FIG. 3 is a longitudinal sectional view and at same time a radial and axial view through an other embodiment of a piston and piston shoe assembly of the invention.

FIG. 4 is a longitudinal sectional view through a portion of a device of another embodiment of the invention and shows portions of a pump or motor, wherein a hydrostatic radial bearing is provided between the housing and the rotor, a novel communication is provided and the bearing may also act as a thrust bearing.

FIG. 5 shows a crossectional view and partially a view from the rear end onto and of a control body arrangement of the invention whereby the control body is partially visible also in the embodiment of FIG. 4.

FIG. 6 is a longitudinal sectional view through an other embodiment of the invention of a double acting radial and/or axial bearing.

FIG. 14 is a longitudinal sectional view through a portion of a device, which illustrates another embodiment of the invention.

FIG. 15 is a cross-sectional view through a further embodiment of the invention.

FIG. 16 is a longitudinal sectional view through a disc spring portion of a further embodiment of the invention.

FIG. 17 is a related sectional view longitudinally taken through another embodiment of a disc spring portion of the invention.

FIG. 18 is a cross-sectional view through a simple pump or motor of a still further embodiment of the invention.

FIG. 19 is a longitudinal sectional view through an embodiment of the invention.

FIG. 20 is a longitudinal sectional view through an embodiment of the invention.

FIG. 21 is a longitudinal sectional view through an embodiment of the invention.

FIG. 22 is a sectional view through a disc spring portion of the invention.

FIG. 23 is a sectional view through a disc spring portion of the invention.

FIG. 27 is a view onto an embodiment of the invention from the side thereof.

FIG. 28 is a cross sectional view through FIG. 27 along the arrows therein.

FIG. 29 is a view onto a portion of an arrangement of the invention.

FIG. 30 is a view onto the vehicle of FIG. 29 from the rear.

FIG. 31 is a view onto the portion of FIG. 29 in a modified situation.

FIG. 32 is a view from the rear onto an arrangement of the invention.

FIG. 33 is a cross-sectional view through FIG. 32 along the arrowed line therein.

DESCRIPTION OF THE PREFERRED EMBODIMENTS

Figure 7:
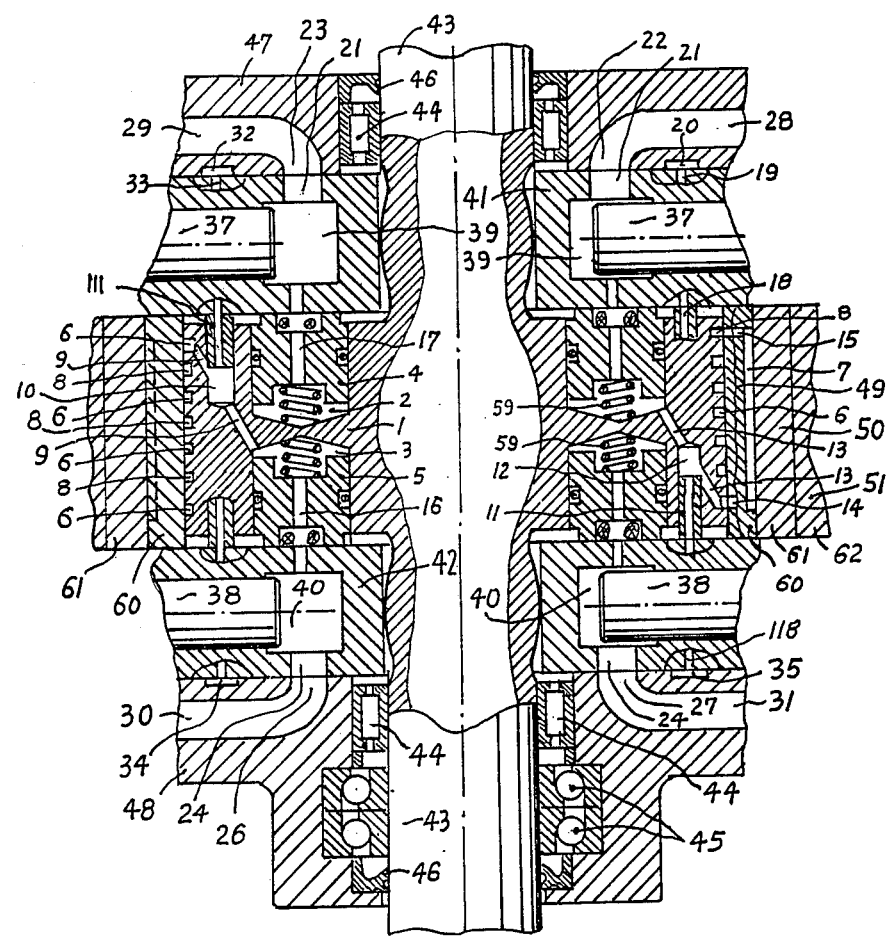
FIG. 7 is a longitudinal sectional view through a rotor, bearing and adjacent portions of another embodiment of a pump or motor of the invention.

FIGS. 1 to 3 demonstrate two embodiments of high-pressure piston-piston shoe assemblies of the invention. Piston and shoe assemblies are known in great number from my elder patents and from other patents. However, either they were of limited capability to carry high radial load under high pressures or they had only a limited length of piston stroke per given diameter of the device. That limited either the pressure of the device or the flow through quantity per revolution of the rotor of the device. The embodiments of these FIGS. 1 to 3 now are combining a relatively long piston stroke with the very high pressure capability of the piston and shoe. For this purpose the embodiments of FIGS. 1 to 3 are providing the piston head with a bearing face 10 of a radius 8 around the second axis 5 which is normal to the first axis 4 of piston 1. The radius 8 is longer than the radius 39 of the outer diameter 37 of piston 1. Thereby the large capacity to carry a high radial load is obtained.

The bearing face 10 extends over the entire cross-sectional area of the piston which gives the large dimension of the bearing face 10. The bearing face 10 is formed with radius 8 around at least a portion of the first and second axes 4 and 5. When the bearing face 10 is spherical it is formed with radius 8 around the meeting point of the first and second axes 4 and 5. When the bearing face 10 is of part-cylindrical configuration, the radius or first radius 8 is formed around the second axis 5. The piston shoe slides with outer face 12 along the inner face 13 of the piston stroke actuator 14 as usual in my devices. The piston shoe 2 gets swing face 11 of a second radius substantially equal to the mentioned first radius 8, to permit the smooth sliding of face 11 along face 10 during the swing or pivotion of the shoe 2 on piston 1. Common to FIGS. 1 to 3 is a bore 6 along the normal second axis 5 and the setting of a pin 7 into it. Pin 7 extends on both ends out of the bore into a reception spaces 18 on both ends of the bore 6. The reception spaces 18 are cut into the piston 1 and form therein flattened portions 35 and 36.

The embodiment of FIGS. 1 and 2 differes from the embodiment of FIG. 3 slightly by the keeping arrangement, which keeps the piston 1 and shoe together to prevent escape of the swing face from the bearing face. The keeping arrangement includes at least a keeping element 19,29 and an entering part 20, which enters space 18 to embrace the ends of pin 7.

In FIGS. 4 and 6 a solution for bearing a rotor in a housing is demonstrated. Rotor 26 is revolvably borne in housing 27. The Figures are longitudinal sectional views through respective portions of respective devices. Rotor 22 is subjected to a radial load for example out of chamber 20. It may also be subjected to an axial load in the direction to the right in the figures. When the device is a radial piston machine of one or more of my elder patents or co-pending patent applications, a piston 21 may reciprocate periodically in cylinder 20 and a piston shoe 23 may be interposed between piston 21 and piston stroke actuator guide 24. Traction rings 25 may embrace portions of the piston shoe 23 and the rotor 22 may have a shoulder 26. It was custom heretofore to bear the rotor or rotary member 22 in antifriction roller-needle or ball bearings with rolling parts like balls, rollers or needles between inner and outer bearing rings.

Such bearings however had a rather big size, when they should bear a heavy load and their life time was limited. It was also already applied to set hydrostatic slide bearings into a housing to carry a revolvable rotor therein. However, to lead fluid under pressure into the respective pockets of the hydrostatic bearings was difficult and commonly demanded a specific hydrostatic pump and complicated fluid lines.

With the arrangements of FIGS. 4 and 6 such difficulties shall be reduced and hydrostatic bearings are shown in accordance with this embodiment of the invention, which are small in size, effective in operation and which obtain the required hydrostatic pressure fluid in a most inexpensive and reliable way.

According to these embodiments of the invention, an inner bearing ring 9 is mounted on rotor 22 and may have a radial shoulder to be borne on the shoulder 26 of the rotor 22. The inner ring 9 has a cylindrical outer face 53 and the housing 27 has a cylindrical inner face 54 substantially at least partially radially of the outer face 53. The bearing bush 1 is inserted according to this invention, between the inner face 54 and the outer face 53. Bush 1 also is provided with the hydrostatic fluid pressure pocket 2 which is open towards the outer face 53. Pocket 2 extends along the periphery of the outer face 53 for commonly less than 180 degrees. This extension is placed in the direction to the load in the chamber 20 diametrically opposite of the axis of the rotor. The problem arising is, to transfer the pressure from the opposite high pressure chamber 20 into the pocket 2. This is preferred to be done, according to this embodiment of the invention, by setting passage 6 through the housing 27 to communicate it with the high pressure chamber 7 between two neighboring seats 34,37 of the control body 28 and to communicate the other end of passage 6 by a respective passage 5 through the bearing bush 1 to the fluid pressure pocket 2. This arrangement is a most effective one and it is convenient in manufacturing. When the bush and pocket 1 and 2 are properly located and dimensioned wherefore the Figure gives an example, and when the fluid is a good lubricating and dustfree fluid, like good oil, the life time of the bearing arrangement of this embodiment of the invention is almost limitless. Of further use is it's good efficiency, little friction and its extremely small size. The size of this bearing is much less than the size of a bearing of the common ball-bearing, roller bearing or needle bearing types. The entire device is thereby building more compact with less weight.

When the bearing arrangement shall also carry an axial load, the fluid pressure pocket 3 is provided on the innermost end of the bush 1 and open towards the shoulder of bearing ring 9. The shoulder 9 there forms a radially plane face on its end, whereon the innermost radially plane end face of the bush 1 can slide. Fluid pressure pocket 3 is communicated by passage 5 to fluid pressure pocket 2. Proper dimensioning and location wherefore the Figure gives a sample, provides an almost eternal life of the axial bearing capacity of this arrangement.

In several practical applications, the bearing bush 1 is mounted axially moveable in housing 27. For that purpose a thrust chamber 4 is provided between the housing 27 and the bush 1. This thrust chamber 4 may be of a narrow radial dimension as shown in the figures. The housing 27 may form a second seat 8 radially of the bush 1 with a respective cylindrical inner face corresponding substantially to a respective second cylindrical outer face on bush 1. Both second faces are closely fitting relatively to each other, but they are permitting an axial movement relatively to each other. The same applies to the first cylindrical inner and outer faces left of pocket or chamber 4 on the innermost outer portion of bush 1 and the neighboring housing portion. Respective plastic or deformable seals, like for example, O-rings, may be inserted in chamber 4 to seal the same. The already mentioned passage 7 may be communicated with chamber 4 and so so may the passage(s) 5 of the bush 1.

FIG. 6 demonstrates, that the pressure from an axially second chamber group 20 in rotor 22 may be led into third and fourth fluid pressure pockets 10 and 13 in bush 11 of FIG. 6. Thereby a double acting bush 11 is obtained, which evaluates pressures in two different working chamber groups 2 of a rotor 22.

The first fluid pressure pockets set 2,3 is similarily located and communicated in FIG. 6 as in FIG. 5. The passage 6 may be drilled in two steps for convenience of manufacturing, whereby one of the ends of the passage is then closed by pin or closure means 32. The second set of fluid pressure pockets, which shall be provided with the probably different pressure from the second working chamber group 20 in the rotor 22 of the device must however be communicated differently. The second axial fluid pressure pocket 13 and the second radial fluid pressure pocket 10, if so desired, are (is) therefore communicated by passage 15 to a second thrust chamber 14 and from there by passage 16 through a cover 30 to the other axial portion of the rotor 27 or to the opposite axial control body 27 on the other axial portion of rotor 22. The communication of passage portions 16 in the cover or housing 27 with the passage portion 16 in cover 30 may be sealed by a respective seal 32 and the cover 30 may be fastened by bolts or fasteners 31 to the housing or cover 22. This arrangement of FIG. 16 may therefore have two thrust chambers 4 and 14 with respective cylindrical seal face portions 54,55 and 56.

It might be noted, that this pump is especially suitable for hydraulic power shovel pumps with plural flows of separated fluid flows of different pressures out of the fluid flow producing means of embodiment of FIG. 6 of the invention.

The specifics demonstrated in FIG. 4 in combination with FIG. 5 regarding the control body arrangement of control body 28 will be described later in this specification.

In FIGS. 4 and 5 the control body 28 is substantially similar to the control body of my U.S. Pat. No. 3,850,201. The control bodies of my U.S. Pat. No. 3,850,201 have worked very satisfactory and are working satisfactory in the heretofore common applications. Presently however it is desired to increase the pressures and rotary velocites of the rotors in fluid machines, like pumps or motors to a much higher rate of pressure or speed. For example to pressures exceeding 5000 or even 10,000 psi.

At such high pressures however, I have discovered, that my control bodies have a tendency to pivot under the friction between the control faces of the control body and the rotor. Such pivotion, which defines a pivotal movement pivotion, if it occurs, results therein, that the centric and excentric faces are pressed together locally and the control body then sticks. It loses its ability to move axially and it loses its ability to adjust to the small round running mistakes of the respective rotor. The difficulty arising is, that such sticking of the control body occurs under a very steep angle, almost like a cone in the drilling machine spindle. Thereby the control body obtains a very strong self locking which is so strong, that, once it has occured, the control body becomes unable to soften or losening itself. The device is then improper in operation and welding, friction and leakage are appearing between the respective control faces.

The invention now discovers, that such sticking can be prevented even at very high pressures by respective improvements to the control body arrangement. FIGS. 4 and 5 are demonstrating such improvements in these embodiments of the Figures.

The first improvement is, that the diameter of the front seat 34 becomes radially bigger in diameter. The diameter of the front seat 34 is in accordance with this invention to be made 1,2 times plus/mimus 0,1 times of the outer diameter 33 of the control face.

The second improvement is, that the gravity centre "gc", in this FIG. 5, the gravity centre "gco", does not become calculated any more by the equations of my mentioned patent, but by the equation:

$$g_{co} = -(r_m^2 e)/(r_o^2 - r_m^2) \qquad (1)$$

Therein "ro" is ½ of diameter 34 and "rm" is ½ of diameter 37.

The third improvement is, that the medial face which is normal to the medial face through the thrust chamber 7 and the control face on the front end of the control body 28 becomes turned six degrees plus/minus three degrees in the direction of rotation of the rotor and relative to the medial normal face to the medial face through the inner and outer death points, which means through the positions of largest and smallest volumes of the working chambers 20 in the respective rotor 22.

With these improvements the efficiency, life time and capability to work at higher pressures and relative speeds of the control body 28 is very much improved. Commonly one or more of these improvements single or in combination obtains the desired results.

When the control body builds however extremely long in axial direction, it is occasionally required to set an arresting means, which prevents rotation of the control body and thereby prevents pivoting of the control body 28. The here discussed FIGS. 4 and 5 now demonstrate, how an effective arrangement can be provided to the control body 28. Accordingly the control body 28 obtains a bore 40 with a first axis 43. Thereinto extends an arresting bar 41 with a second axis 42. The arresting bar 41 is borne in the seat 46 in the hosusing 27 and it is pivotable therein. A setting means 44 may be added to the bar 41 or be integral therewith. Setting arrester 45 may be utilized to finally set the arresting pin 41. It would be enough to spare the means 44 and 45, if the arresting pin 41 could be accurately set into the bore 40. However, commonly it is not possible to set the bar 41 excactly centrically into the bore 40. The present technology of machining makes this to difficult and occasionally impossible.

Therefore the bar 41 is in this embodiment preferred to be provided with an eccentric portion 41 which is eccentric relatively to the axis 43 of its outer end portion in seat 46. Axis 43 of the mentioned outer end portion in seat 47 may be coinciding with the axis 43 of the bore 40. When the arresting bar 41 is pivoted in seat 46 by member 44, it finally touches, due to the eccentricity between axes 42 and 43 the respective portion of the wall of bore 40 and thereby prevents a pivoting of the control body 28 in the direction of rotation of the rotor 22. This is just, what according to this embodiment of the invention is desired. Once this meeting of portion 41 of bar 41 and of the wall of the bore 40 is reached, the setting portion 44 bcomes arrested in this position of pivot of arresting bar 41 by the setting or arresting means or bolt 45 relatively to the non-revolvable housing portion 27. The arresting of the control body 28 against rotation or pivot in the direction of rotation of rotor 22 is now perfectly prevented in accordance with this embodiment of the invention. The control body 28 is now able to work at the highest pressures and rotary velocities of rotor 22. Details will also be understood from FIG. 5 which is a cross-sectional view through a portion of FIG. 4 along line V, and, wherein 38 and 39 are the control ports, while bores 49 and 50 are alternative locations for bore 40.

Figure 8:
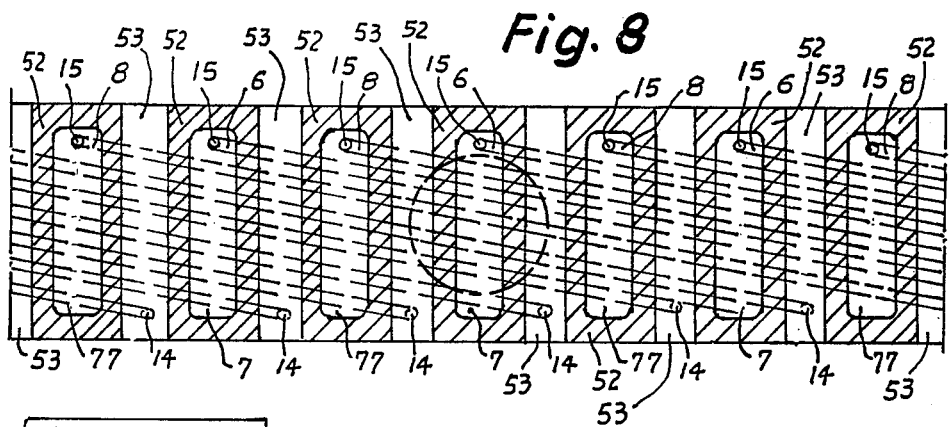
FIG. 8 is a "roll-up" peripheral sectional view through a bearing portion of FIG. 7, and illustrates an embodiment of the invention.
Figure 9:
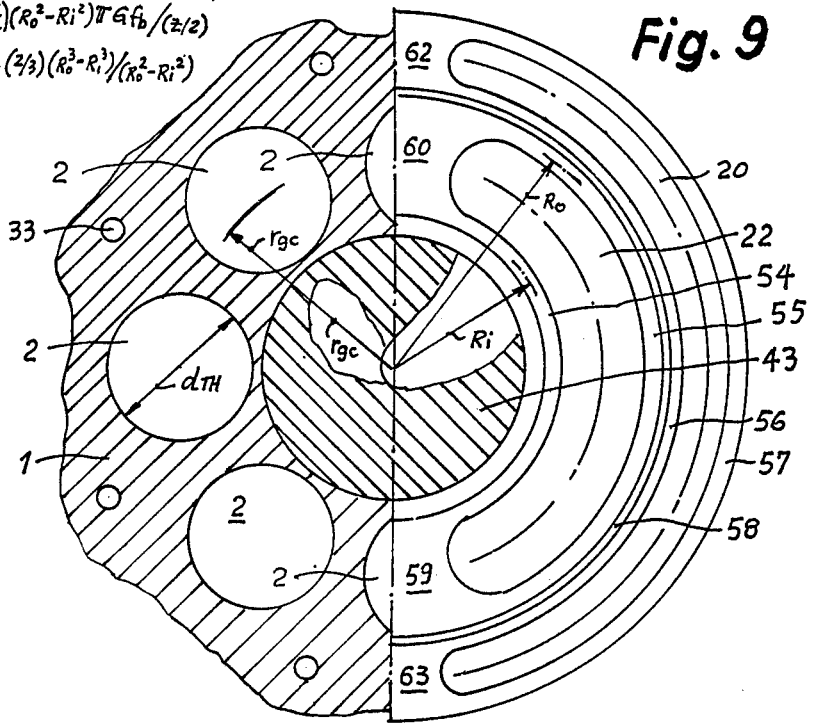
FIG. 9 is partially a view onto the control face and partially a cross-sectional view through the thrust arrangement of FIG. 7.

In FIGS. 7 to 9 a fluid handling device as for example, a hydraulic or hydrostatic pump or motor is demonstrated. It is closely related to the device of my co-pending patent application Ser. No. 232,935 which was filed on Feb. 9, 1981 as a divisional application of my co-pending application Ser. Nos. 910,805 and 911,246 which were filled on May 30th and 31st of 1978 respectively.

The devices of my mentioned co-pending patent applications have worked quite satisfactory at common applications.

However at present time it is now required to apply the devices to still higher pressures, relative speeds between adjacent forces and to higher differences in pressure in fluid in the different flows of fluid through the different working chamber groups of the respective devices.

I have now found, that the aim of still higher pressures in flows and of relative speeds between adjacent faces can be obtained only, when certain improvements are added to the devices of my co-pending applications. Such improvements are content of the present embodiment demonstrated in FIGS. 7 to 9.

Accordingly the improvements by this invention consists in the application of second passage- and seal means through the medial portion of the drive rotor to an opposite axial control face portion with a second fluid pressure balancing pocket therein.

Due to an other improvement by this invention, the diameter of the thrust pistons and of the thrust chambers wherein the thrust pistons are axially moveably located, must have a diameter substantially equal or slightly higher than the root of (pi/4) (Ro² − Ri²) pi G fb/(Z/2).

And, according to an other improvement by this invention, the axes of the thrust chambers and thrust pistons must be located on the integral medial radius "rgc" of the control face, while the said medial radius must correspond to the equation "gc"=(2/3)(Ro³−Ri³)/(Ro²−Ri²).

Thereby the following two equations should be obeyed in accordance with the respective objects of the respective embodiments of this invention:

$$d_{TH} = (pi/4)(R_o^2 - R_i^2) pi G f b/(Z/2) \qquad (3)$$

and:

$$r_{gc} = (2/3)(R_o^3 - R_i^3)/(R_o^2 - R_i^2) \qquad (4)$$

With pi=3,1416; G=face percentage, commonly about 0,5 and $f_b$=balancing factor, commonly about 1,06 plus/minus 0,04. While Ro and Ri are the medial radii of the sealing lands around the control ports of the control face as shown in the respective FIG. 9.

Figure 10:
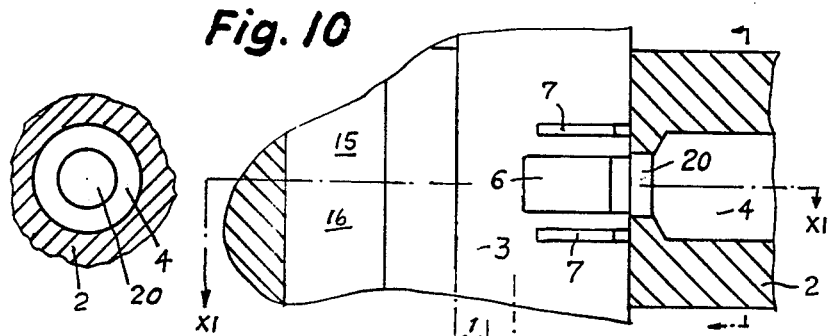
FIG. 10 is a longitudinal sectional view through a portion of a rotor with a view onto a portion of a control body therein and with a cross-sectional view in the left portion of the figure along the arrow in the right portion of the Figure.
Figure 11:
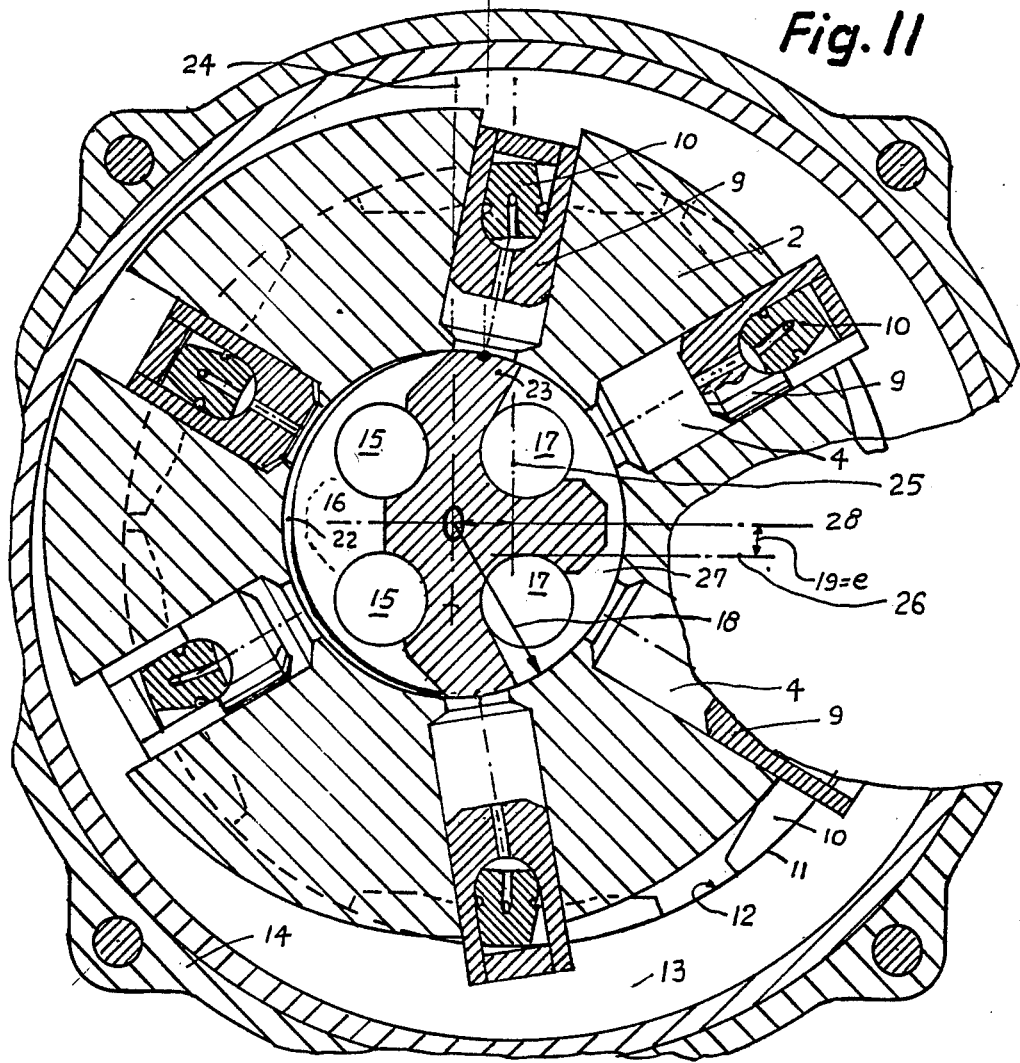
FIG. 11 is a cross-sectional view through a device of FIG. 10 and illustrates the distancing of the axis of the stroke guide in two different dimensions away from the axis of the rotor and is thereby illustrating another embodiment of the invention.

In FIGS. 10 and 11 an embodiment of the invention is demonstrated, which deals with a novel location of the axis of the rotor to improve the control of flow and to silence the pump or motor.

Common to the technology which is known in the art of my earler patents, the rotor 2 has substantial radial cylinders 4 with pistons 9 periodically reciprocating therein. Piston shoes 10 are interposed between the pistons 9 and the piston stroke actuator ring 13. The piston shoes 10 have outer faces 11 which are sliding along the inner face or piston stroke guide face 12 of diameter "da" provided on piston stroke guide or piston stroke actuator 13. The rotor 2 is revolvably borne in housing 14 and the piston stroke guide 13 is also provided in housing 14. The rotor 2 has a central rotor bore, called the rotor-hub, wherein the control body 3 is located. Control body 3 has intake passages 15 and exit passages 17. The exit passages may become intake passages and vice versa, when the device is reversed from pump to motor. Control body 3 has a high-pressure control port 6 with sealing lands therearound and the unloading recesses 7 in the control body 3 at certain axial distances from control port 6. The cylinders 4 have narrow rotor passages 20 of a smaller diameter than the diameter of the cylinder 20 is. This is visible FIG. 10, wherein the left portion of the Figure is a cross-sectional view through the right portion of the Figure, along the arrow in the right portion of the Figure. The Figures are shwoing respective portions of a respective pump or motor. Fig. 11 corresponds to FIG. 10 as a cross-sectional view through the right portion of FIG. 10 along the line XI—XI. Between the cylinder 4 and the narrower rotor passage 20 a cylinder bottom portion appears, whereonto the pressure in fluid in cylinder 4 acts to press the cylinder bottom and thereby the rotor 2 against the outer face of control body 3 to tightly seal the high pressure control port 6 as far as possible. The contrary directed forces onto the bottom of cylinder 4 and onto the inner face of the rotor hub out from control port 6 and the sealing lands therearound is respectively considered in the design of the device. The eccentricity between the axes of the rotor and of the guide face 12 and actuator 13 is "e" and shown by 19, whereby the stroke of the pistons is 2 times, "e" at the inward stroke and 2 times "e" at the outward stroke of pistons 9. There is one inward stroke and one outward stroke per piston 9 and shoe 10 at each revolution of the rotor 2. So far the arrangement is known in the art.

It has also been tried in one of my mentioned co-pending applications, to press the rotor 2 and the control body 3 together to each other in the high pressure area. A wider clearance 22 appears then between rotor and controlbody 2 and 3 in the low pressure area. The strengthening portion 16 of the control body 3 which is shown by dotted lines in FIG. 11 may be spared in the low pressure area in order to make space for a smooth and slow suction or low pressure flow.

In such arrangement, for example, as in my mentioned co-pending application(s) the sealing faces between rotor 2 and control body 3 are defined by radius 18 and it has now been discovered in accordance with this present invention, that such devices are rather noisy, because the change from low pressure to high pressure is appearing too suddenly when the cylinder 4 and piston 9 arch moving over the closing arc 23.

The invention aims to overcome this problem and to provide a pump or motor with a smoother and more silent operation. This is done thereby, that the center of closing the rotor passge 20 is removed from the medial plane 24 of the device by the distance 1 towards the righ pressure half-side of the device. To obtain this, the axis of the rotor 2 is moved by the distance 28 away from the axis of the housing 14 or from the axis of the actuator or guide body 13 with inner stroke guide face 12. The center line of the rotor 2 and thereby the axis of rotor 2 is now located by "0" wherefrom the radius 18 starts. The medial plane through the inner and outer dead points of the piston strokes which is in other words the medial face through the positions of smallest and largest volumes of the cylinders 4 is now located in plane 25 but not any more in plane 24 of the former art. The piston stroke follows the medial plane 25 along the eccentricity "e" between points 28 and 26. The closing arc 23 now has already closed the respective rotor passage 20, when the outer or inner dead point of the piston 9 is reached, while at the former art the respective passage 20 was still partially open to the low pressure half, when the said dead point of the respective piston 9 was reached. A proper build of to pre-compression of fluid in the respective cylinder 4 was therefore not possible in the former art, but it is now possible by extending the closing arch 23 in the direction of rotation into the high pressure half of the device. Thus, the invention provides a proper pre-compression in the fluid in the closed cylinder 4 before the cylinder becomes connected by the rotor passage 20 to the high pressure port 17–27. The negative influence onto this operation by the wider clearance 22 is prevented.

In FIGS. 12 to 19, 22,23 and 34 embodiments of disc-spring arrangements are illustrated, which are closely related to my co-pending patent application Ser. No. 224,769 which was filed on Jan. 13, 1981.

Figure 13:
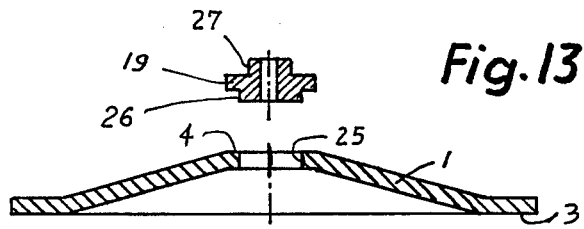
FIG. 13 is a similar longitudinal sectional view through a related embodiment of the invention.

Referring first to the details showing and separated parts showing drawing of FIG. 13; the disc spring of my invention is shown by referential 1. The specifcs of my disc spring 1 are, that they are provided with the flat plane end faces 3 and 4 on the bottom outer end and on the top inner end. The spring 1 may also have an inner centering seat 25.

With this spring I can pump a fluid in the range, which I am calling the sub-critical range of the pump's disc spring 1. This sub-critical range is limited to operation below the sub-critical pressure in fluid. At this sub-critical range the spring 1 is strong enough to resist the axial forces of fluid onto the spring 1 without departing from a seat, whereon the disc spring may lay and seal with flat plane face 3 and/or 4.

The disadvantage of a single disc spring in a pump, compressor or motor is, that the efficiency of the device becomes very low. The fluid acts in axial direction with pressure against the spring, and the spring resist this pressure by the spring capability of the material of the spring, for example, of the spring steel. To pump with a single disc spring, the spring must be stronger restisting, than the entire area of pressure loading supplies fluid pressure. Therefore, the pressure in the fluid will at all times remain in this sub-critical range so low, that only less than half of the axially directed force, which shall move the fluid axially in a pumping stroke, can be used to pump fluid, while at least or slightly more than the other half of the said force is used to compress the spring in the sub-critical range of my invention. Consequentely, the efficiency of the single spring in a pump in the sub-critical range remains at all times below 50 percent total efficiency.

My first means to overcome this problem, is, to set a second spring 1 onto the first spring 1 and mount the second spring diametrically opposed to the first spring 1, whereby a pumping space is formed between the two springs 1 and 2. The axial thrust force required to pump, is now the same, because the compression of the two springs requires only the same force as the compression of the one spring 1 does. But the delivered fluid becomes the double amount.

The length of the way of compression however is now doubled compared to the single spring. Consequentely, the force has remained equal, but the way of stroke has doubled, so, that in overall, a better afficiency of the compression or thrust arrangement is obtained, but the power amount required in the springs 1 and 2 has not much decreased compared to the ratio of the power to the fluid pumping relatively to the one single spring 1.

If the pressure in the fluid decreases over the critical pressure between the sub-critical stage and the super-critical stage, the fluid force onto the spring 1 and/or 2 becomes so high, that the springs 1,2 deflects and escapes with its respective end seat face 3 or 4 from its seat in the pump. The pumping chamber below the respective taper of the respective disc spring 1 or 2 then opens and the pumping action is disturbed. The pump experiences a big leakage of fluid and returns to the sub-critical stage.

Figure 12:
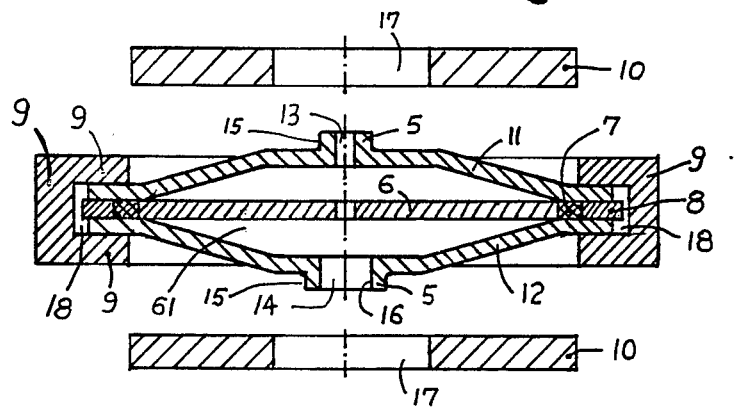
FIG. 12 is a longitudinal sectional view through parts of a disc-spring assembly of an embodiment of the invention.

With this knowledge obtained from the present invention, I now arrange the super-critical stage disc spring arrangement of FIG. 12.

In FIG. 12 disc springs 11 and 12 are laid together similarily with opposite direction as shown by 1 and 2 in FIG. 13. I prefer to lay the outer plane faces 3 onto a plane ring 8. Plane ring 8 is an outer ring. In the interior of the outer ring I prefer to lay a seal, for example an O-ring 7. Inside of the o-ring 7 I prefer to mount an inner ring 6 of equal this thickness as the outer ring 8 has. This inner ring 7 acts at the same time as a dead space filler to prevent dead space in the pump chamber 61. For high pressure this dead space filler 6 is important, because when it is not assembled, the fluid would compress in the then hollow space and that would result in a delivery and efficiency loss. Plate 6 becomes a respective at least one passage to pass fluid from the both chamber halves in chamber 61 to the other halves. I prefer to drill a bore of small diameter into the middle of the inner plate 6. If the diameter of this bore is too big, I experience a respective compression loss. But if it is too small, the pump will have respective losses by friction, turbulence and vortices in fluid.

The most important portion of the arrangement of FIG. 12 is the provision of the clamping arrangement 9 of the invention. Clamping arrangement 9 has an inner space 18 which is flaked by inwardly extending ring-arms 9A, 9B, which are embracing the outer radial portions of the disc springs 1 and 2. Thereby the springs 1 and 2 or 11 and 12 are clamped together or kept together in axial direction. It is important, that the clamping arrangement 9 is strong enough to resist it's own deformation. The higher in the super-critical stage of high pressure the pump shall operate, as stronger must the clamping arrangement 9 be. It must at all times remain so strong, that the springs 11 and 12 can not depart from the outer ring 8 therebetween. Because, if they would depart, the seal 7 would enter the clearance produced by the departure. There the seal would then stick and the pump can not work normal any more.

Also important is in actual design and manufacturing is that that the interior annular ring groove 18 is radially wide enough to provide a space radially outwards of the outer ends of springs 11 and 12. Because by pumping and thereby compressing the springs 11,12 the outer diameter of the springs 1,2,11,12 is slightly increasing. Thus, when there is no space radially outward of springs 1,2,11,12, the clamping arrangement 9 would with its medial portion prevent the radial enlargement of the springs 11,12 and thereby it would prevent the compression and the pumping action of the springs 11,12.

The interior space 18 should also be radially wide enough to permit the respective radial expansion of the outer ring 8 in it. Outer ring 8 should be radially wide enough to withstand the pressure from the fluid in the inside in order to prevent breaking of ring 8.

In practice I often add a centering arrangement to the springs 1,2,11,12 of the super-critical range to center multiple disc springs 1,2, 11,12 axially behind each other. Because this will bring good efficiency increases. FIG. 13 shows centering seat 25 whereinto a centering body 19 may be inserted with centering seat 26. Centering body 19 may have a second centering seat 27 on the other axial end thereof. Seat 27 may fit into the third centering seat 29 of a second centering body 20 and the fourth centering seat 28 on the other end of the second centering body 20 may fit into seat 25 of disc spring 1. With the utilization of the centering bodies a number of disc-spring pairs 1,2 can become assembled axially behind each other.

FIG. 12 demonstrates additionally, that the centering bodies can be spared by providing centering portions and seats 5,15,16 on the disc springs 11,12 whereby the disc springs and centering bodies are becoming integral parts. In any case however, the centering bodies 19,20 or the centering portions 5 of the respective disc spring 1,2,11,12 must have a passage 13,14 to permit the flow of fluid into and out of the pumping chamber 61 between the disc springs of the disc spring pair.

To prevent an axial deformation of the respective disc springs 1,2,11,12 by a belly-configuration under very high pressure in the fluid, the ring plates 10 should be laid onto the axial outsides of the respective disc springs 1,2,11,12. The ring plates 10 should have an interior medial bore 17 to contain the respective centering portion or centering body 5,19,20 and probale seal means.

Figure 34:
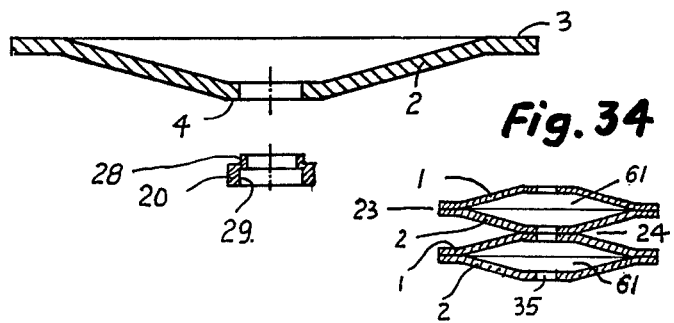
FIG. 34 is a longitudinal sectional view through a still further embodiment of a disc-spring chamber of the invention.

Below FIG. 13 the FIG. 34 is shown. This illustrates a disc spring assembly of the invention for a bright future and mass-application, because it is simple and requires only little space. In this embodiment of the invention, the disc springs 1 and 2 of FIG. 13 are made of a glueable material with spring steel action capability. I prefer to make these springs 1,2 of carbon-fiber material. This material acts in the same way as a metallic disc spring, which would be made of spring steel. But this material has the feature, that it can be glued together by adheasive material; f.e. by epoxy resin. If glued together by faces 3 at location 23 and with faces 4 by location 24, a respective disc spring pair is fastened strongly together and does not require the more expensive clampning arrangement of FIG. 12. By gluing places 24 with faces 4, a multiple disc-spring assembly of multiple or plural disc spring pairs can be made. This is demonstrated in FIG. 34.

Since the clamping of FIG. 12 or the gluing of FIG. 34 now holds the radial outer ends of the disc springs of the respective pair together, these assemblies are now able to operate in the super-critical range. The pressure in the pumping or motoring chamber 61 can now become very high and exceed the sub-critical pressure.

The force required to compress the spring(s) 1,2 can now in the established super-critical range of my invention become smaller than the force to deliver fluid or to consume fluid in a motoring action. The force required to compress the springs may even become neglectible small compared to the force to pump or the force experienced in a motor. The efficiency of the pump or motor can thereby become increased very considerably and can reach higher values than 90 percent overall efficiency. It is seen also here, how important the inner ring 6 is to prevent internal compression in fluid and how important the ring plates 10 are to prevent undesired deformation of the springs 1,2. The assembly of FIG. 34 does however not need the ring plates 10, because in this assembly, the springs 1 and 2 are assisting each other against fatal deformation.

In this regard it is also to be considered, that the disc springs 11 and 12 in FIG. 12 will cause a friction, when the ends thereof are moving radially—if only slightly—within the clamping arrangement 9. To spare this friction and to obtain a better efficiency I am applying in practice often the arrangement of FIG. 14. The the clamping arrangement 9 is made by three rings 89 to 90, which are clamped together by bolts 92 in threads 33. However, the rings 89 to 91 are separated into ring segments A,B,C etc, as shown in FIG. 15. This separation of the rings 89 to 91 into segments A to X is done to prevent the appearance of friction between the clamping rings 89 and 91 and the outer portions 3 of the disc springs 1,2.

FIGS. 16 and 17 are now showing, that a practical solution should be added to prevent an escape of the segments 89 and 91 A,B,—X from the disc springs 1 and 2. Accordingly, FIG. 17 demonstrates an annular grove 30 in the radial outer portion of disc spring 1 or 2.

FIG. 16 illustrates the application of a finger-like ring segment portion 31 which extends axially away from the plane face 32 to enter into the respective ring groove 30 of the respective disc spring 1 or 2. Such keeper portions 31 are provided on clamping rings 89 and 91.

In practical application I am applying this system to disc springs of hardened steel and also harden the ring segments of rings 89 to 91 accordingly. The machining should be made accurately in order that no too deep a ring groove 30 would disturb the strength of the spring 1 or 2. In practical application I am utilizing this embodiment of my invention to pump water in the pumping chambers 61 of FIG. 14 with a pressure of 10.000 to 40.000 psi. At the same time I am keeping the water separate from other fluids in the device of FIG. 14.

In case of application of the arrangement of these FIGS., 14, 16, 17, 15, the force required to compress the springs 1,2 is very small compared to the force required to pump the fluid or water with such a high pressure. This arrangement acts at such high pressures in the fluid very deeply in the super-critical stage or range of my invention. Consequently, the very high efficiency of the super-critical range compared to the very low efficiency of the sub-critical range is effectively and reliably obtained by this embodiment of the invention.

In the sample of an embodiment of the invention of FIG. 14, which embodies the capability of operation in the super-critical range of my invention. the pump in the right portion of the Figure is driven by my fluid motor in the left portion of the Figure.

Motor rotor 113 has radial cylinders 116 with pistons 117 reciprcating therein. Piston shoes 119 are interposed between the pistons 117 and the stroke guide arrangement 121. The motor is contained in housing portion 148. The pump is contained in housing portion 130. The driving fluid is supplied into the motor and cylinders 116 through control body 120.

Motor and pump have a common axis 97, but there may be different axes 97, especially when a speed reduction gear is assembled between the motor and the pump. The shaft is revolvingly borne in bearings 114 and provided with the eccentric cam ring portion 55. But 55 may also be a separated ring, mounted onto the respective shaft. Housing portion 48 is provided with a head cover 48 which has the inlet and outlet passages 122 and 123 to the inlet valve 50 and the outlet valve 49. Springs 51 may be provided to hold the valves closed at times, when they should not open. Head cover 48 also has the first seat for holding the disc spring 1 with a respective seal seat 39 and seal 40 therein, as shown in an enlargement in FIG. 23 to seat the seat and the disc spring 1. Outer ring plate 6, inner ring plate 6 and the seal 7 therebetween are assembled as in FIG. 12 and the clamping arrangement consisting of the ring segments 89,90, and 91 A to X are assembled, as already discussed. The disc spring 2 is borne with its inner portion on pump-piston 94. Disc spring 1 is provided or attached to the seal 38 for example, in seal seat 37 as shown in an enlargement in FIG. 22. This seal may replace seal ring 7 if so desired. Springs 2 may have the same seal arrangements as springs 1 of FIG. 22 or 23. In any case, the bottom disc spring 2 is sealed against piston 94.

Piston 94 may be provided with a spring containment space 88 for the clsosing of the inlet valve 50. Piston 94 may also have a seat or bore for a centering pin 87. Centering pin 87 may extend into the exit valve passage and thereby prevent rotation, dislocation or pivoting of the piston 94. Between head cover 48 and piston 94 is the pumping or working chamber 61 provided. It should be understood, that the ends of piston 94 and of head cover 48 should be suitably dimensioned to prevent dead space in chamber 61, when the springs 1,2 are respectively compressed.

In practical application I am running the cam ring 55 of the pump with approximately 500 rpm and compress the springs 1 and 2 less than 50 percent of their strokes in order to obtain a long life of the springs. Two million strokes are possible at these rpm and stroke ranges. When the springs 1,2 are compressed at the degree of rate compared to maximum of stroke, the end faces of piston 94 and of head cover 48 should meet or be so close, that dead space in chamber 61 is only a minimum or entirely prevented. At higher rotary speeds and rates of strokes compared to the maximum of stroke of the disc spring, the life time of the device will become drastically reduced. This matter is also one of the reasons, why I am preferring a fluid motor to drive the pump. Because the fluid motor can give the desired rpm, what an electric motor or a combustion engine commonly does not do without the application of a speed reduction gear.

Between eccentric cam 55 and the piston 94 is the piston shoe 52 located. It slides on the outer face of cam 55 and the respective other end face of piston 94 swings or pivotes in the other end face of piston shoe 52. Fluid pressure balancing recesses and sealing lands therearound, forming hydrostatic bearings are applied to both radial ends of the piston shoe 94 in order to make the very high forces of tons of load in the size of the Figure possible at less friction and wear. The lubrication-and balancing-fluid is commonly oil and it is introduced into the respective fluid pressure balancing pockets 74 over respective passages 74 by a fluid flow supply pump over passage 95. Thrust bodies and seal plate portions 115 are sealing the supply of the lubrication- and balancing-pressure fluid, for example oil, into the piston shoe 74.

FIG. 18 illustrates an embodiment of the invention which shows a most simple and inexpensive pump or motor for the sub-critical range of my invention. The stroke guide 99 has the inner guide face 156 and it may also be the housing of the device. It may also have an outer inlet passage 101 for the supply of fluid or for the suctioning of fluid into the multiple working chamber 61. Otherwise the fluid may enter into chamber 61 through the inlet passage(s) 105 and inlet control port 150 of an interior control body 102. The fluid will leave the chamber 61 through a respective exit valve as shown in other Figures or through the exit passage(s) 106 and exit control port 149 of said control body 102. In inner bore 104 in control body 102 may extend through the control body 102 and through the entire device. The simplicity of this device exists in the application of the simple sub-sonic disc spring arrangement, which may contain seals as shown in FIGS. 22 and 23 and which are shown by 37,38, 39,40 in the Figure on the respective portions of disc springs 1 and 2.

The other simplicity and thereby feature of this Figure is, that there are not slidingly fitting faces around the pump chamber 61, especially; the close fitting of a piston in a cylinder is spared in this embodiment. The rotor 98 has simple outcuts 22 which losely guide on their wall faces 107 the respective disc-spring assembly. The innermost disc spring is laid onto the bottom of the respective outcut 22. The outermost disc spring of the disc spring set is laid onto the bottom seat portion of the piston 36. Piston 36 has also an inward extension 109 with passage 74 to guide the disc springs 1,2 of the assembly and to lead fluid into and out of chamber 61. The outer end of piston 36 has a bearing bed 110 wherein the piston shoe 21 is borne and able to swing or pivot therein. Respective passages 74 may be provided in the piston shoe to draw fluid from entrance space 101 or to send fluid into the balancing and lubrication pocket 112.

Since this arrangement does not require closely fitting pistons in cylinders, the manufacturing can be done with rough tolerances. At present state of technology, only the inlet valves and exit valves or the respective control body must fit. But the other parts can be cast to accurate configuration. For example, the pistons, the rotor, the piston shoes, thereby 36, 98,21, can be cast by lost wax process or shell molding respectively. There must not be much machining thereafter. A little lapping at assembly of the device and here and there a drilling work for a passage bore is often enough to build this device. The embodiment may thereby also work with water or even with dirty fluids, if so desired and built.

In FIG. 19 a still further embodiment of a disc-spring pump of my sub-critical range is illustrated. It has a head 48 with inlet and outlet valves 50,49 which may be spring 51 assisted. It also has a piston stroke drive cam 55 whereon the piston 52 slides.

The specifics of this arrangement are, that the head 48 is provided with a disc spring seat 47 and the piston 52 is provided with a second disc spring seat 53. Pump, or motor chamber 61 acts as in the other Figures and so do the inner passages 13. New compared to the other Figures is in this embodiment the application of inner centering bodies 41 and of outer centering bodies 43 between the respective disc springs 1,2. The inner centering bodies 41 are similar to bodies 19 of FIG. 13, however they are extending with their medial portions radially outwardly to form there portions, which are constituting the ring portions 10 of FIG. 12. The inner centering bodies 41 are thereby a combination of bodies 19 of FIG. 13 with ring plates 10 of FIG. 12. The outer centering bodies have axial extensions 43 and 44 which forms seats to keep the radial outer ends of the respective disc springs 1,2 and they are also having a medial radial inwards extension, which replaces the rings 6 and 8 of FIG. 12. Respective seals 37,38,39,40 of FIG. 22 or 23 may be provided, if so desired.

In FIG. 20 the body 48 contains a working chamber 61 with a reciprocating piston 58 closely sealing and reciprocating therein. Piston stroke actuator 55 has an eccentric outer face 56 to bear thereon the inner face 7 of piston shoe 52 and thereby to drive and guide the piston shoe 52, the second piston 59 and the first piston 58. The first piston 58 is laid with an end face onto the respective end face of the second piston 59. This is done in order, that the first piston may be radially to the axes of the pistons displaced. Because a precise equal axis of the cylinders and pistons 58,52 can not be guaranteed by machining, when the diameters of the first and second piston are different. To further permit the radial displacement of the pistons relatively to each other and radially to their axes, the first piston 58 has a bore 69 axially along the piston's axis. A pin 70 is of smaller diameter than the bore 69 and located in the mentioned bore 69. Holding pin 70 has a pin head 64 to be located and borne in a respective seat in the first piston 58. The seat may be sealed by seal cover 63 against the working chamber 61. Seal 72 may be provided in one of the pistons 58 or 52 to seal between them.

The holding pin 70 also extends into a respective bore into the second piston 59. It is fastened therein and in piston 59 by a respective fastener 71. A further seal 72 is often inserted between the second piston 59 and the holding pin 70. In this arrangement the first piston 58 is a pumping or motoring piston, in short the fluid handling- or working-piston, while the second piston 59 is a drive piston.

Respective fluid pressure pockets 73 are commonly provided between the drive guide 55 and the piston shoe 52 as well as between the drive piston 59 and the piston shoe 52 in order to enable a high radial load under little friction at operation between them. That permits the possibility of very high pressure in the fluid in working chamber 61. Passages 74 are leading the respective lubrication—and balancing—fluid under a respective and often very high pressure into the fluid pressure pockets 73.

While the inwards stroke of working piston 58 is driven into the chamber 61 by drive piston 59 and piston guide 55, the outward stroke of the mentioned first and second pistons 58,59 may be driven by a respective pressure in fluid in drive chamber 67, which borders the ends of the drive piston and of the working piston. Since drive piston 59 has a bigger diameter than the working piston 58 has, the pressure in chamber 67 drives the drive piston downwards at an outwards stroke, while pin 70 with its assembly means draws the working piston 58 along the way together with drive piston 59. Fluid under pressure is led into drive chamber 67 by passage 68. For example, from a respective other accessory pump.

The arrangement of FIG. 20 serves especially to pump a non-lubricating first fluid in chamber 61. For example, water. The second fluid in chamber 67 is often a pure drive fluid, for example oil. This embodiment further demonstrates an other embodiment of the invention, which is the application of the dirty-fluid collection chamber 65 with dirt fluid exit passage 66. When the seal 62 is not tight, which occasionally occures after long operation under high pressure, the first fluid might escape through the clearance between the outer face of the first piston 58 and the inner face of the cylinder wall, whereon the piston 58 slides. A mixture of the first fluid with the second fluid would then appear. That would disturb the cleanliness of the first fluid and also the cleanliness of the second fluid. For example, it would mix the oil with the water. Such mixing is prevented by the application of the dirty fluid collection chamber 65 around the first piston 58 and by passing the dirty fluid away through dirty fluid exit chamber passage 66.

FIG. 21 illustrates still two further embodiments of the invention. The first therof is shown in the upper portion and the other thereof is shown in the bottom portion of the Figure.

Working body 48 has a cylinder, wherein the working piston or first piston 60 is reciprocating and expanding and contracting periodically the working chamber 61 therein. Inlet valve 50 and exit valve 49 are provided similarily as in others of the Figures. The upper or working body 48 is provided according to this embodiment with a radially inwardly open annular ring groove 83 which forms a spring containing chamber 83 wherein a portion of the spring 84 is located. The deeper the ring chamber 83 is, the longer may become the life time of spring 84. Ring chamber 83 is radially respectively to the longitudinal axis of the first piston 60 distanced from the cylinder 61 in order to make a spring with great length of the spring possible. That helps to increase the life time of the spring. The spring 84 serves to drive the first piston 60 downwards in an outward stroke. For this purpose, according to this now discussed embodiment of the invention, the working or first piston 60 has a spring seat 85 to center on piston 60 one end of the spring 84 and a spring bed 86 to bear thereon the spring 84. Thus, the spring 84 presses against the bed 86 of piston 60 and thereby presses the piston 60 outwards in the expansion stroke of the working chamber 61. The bottom end of piston 60 is a plane flat face.

The other embodiment of the invention in the bottom portion of this Figure shows a second piston 59 below the first piston 86. The second piston has one first end with a flat end face, which is borne by the flat end face of the first piston and radially respective to the axes of the pistons displaceable thereon. Thereby the action of FIG. 20 is reversed. While the drive piston 59 of FIG. 20 drove the working piston 58 in an inwards stroke, the working piston 60 of FIG. 21 drives the drive piston 59 in an outwards stroke. Drive fluid in the space between the upper body 48 and the bottom body 148 is thereby spared. Piston stroke guide 55 with outer face or guide face 56 acts as in FIG. 20. The piston shoe 52 is interposed between drive piston 59 and stroke guide face 56 of stroke actuator body 55 with the first piston shoe end face 57 sliding along the stroke guide face 56 as in FIG. 20.

The bottom end of second or drive-piston 59 is formed by a second end face of a radius 77 around a centre 78. Thereby the second face 76 or second end 76 is either a form of a portion of a ball or of a cylinder, depending thereon, whether the center 78 is a point or a center line. The second end face of the piston shoe 52 has a configuration complementary to that of the end face 76 of the piston 59, it has referential 75 and is substantially of a radius 77 of size 77 around center 78 as that of the piston end face 76. The second end face of the piston shoe 52 has thereby the form of a portion of a hollow ball or of a hollow cylinder, depending again thereon, whether the center 78 is a center point or a center line. When it is a centre line 78, then this center line must be normal to the longitudinal axis of the drive piston 59. Drive piston 59 drives the working piston 60 at the inwards stroke and the inwards stroke is guided and actuated by stroke guide 55,56 as in FIG. 20.

A large radius 77, large compared to the radius of the longitudinal diameter of the piston. results in a respectively high capability to carry a great load and thereby to operate the device with very high pressure in chamber 61. In the Figure the pistons reciprocate radially whereby the first and second ends or endfaces are the radial endfaces. The axes of the cylinder and pistons are radial in the Figure. But relatively to the axes of the pistons, the axes are longitudinal and axial axes, while the end faces are extending radially when seen relatively to the axes of the pistons or piston shoe. Piston shoe 52 may again have fluid pressure balancing pockets 73 in its radial end faces 75,57. However the pressure fluid to be lead into them is supplied in this Figure preferredly as in FIG. 14, but only rarely as in FIG. 20.

Bottom body 148 has bottom outcuts 80 to guide the respective fingers or arms 81 of the piston shoe 52 therein. In a rather primitive way such arrangement was already proposed in my U.S. Pat. No. 3,874,271. According to the present embodiment of the bottom portion of FIG. 21, which is also provided, if so desired, in FIG. 20, the outcuts 80 are extending deeply into the bottom body 148 and deeper than the center 78 is located, whereby they are extending beyond the center 78 into the bottom body 148. The piston shoe arms 81 are extending also deeply into the outcuts 80 and beyond the center 78. The ends of arms 81 are forming the guide ends 79 which are guided along the walls 82 of the outcuts. The feature of this arrangement is, that the end guides 79 are substantially in the radial height of the center or pivot centre 78 of the Figure. This enables a perfect keeping and guiding of the piston shoe in outcut 80 and prevents escape of the end guides 79 out of the outcut 80 and away from the guide faces 82.

Figure 24:
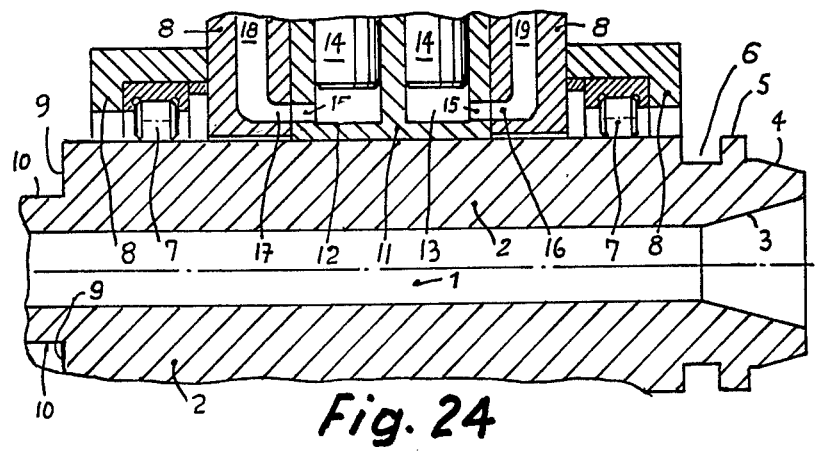
FIG. 24 is a longitudinal sectional view through an embodiment of the invention.

In FIG. 24 the embodiment of the invention, illustrated therein, shows a longitudinal sectional view through a portion of a hollow-shaft motor of the invention. Rotor 11 has a centric rotor bore or rotor hub. But instead of providing a control body therein, the embodiment extends the rotor 11 with respective axial extensions through the bearings 7 and seals out of the housing 8 of the device on the ends thereof. The rotor and its axial extensions then obtains a centric bore 1. Through this centric bore one a shaft to be driven by the rotor 11 or for driving the rotor 11 may be extended. Respective spline means or key means may be added to bore 1. The motor is then conviniently mountable onto a machine tool, vehicle or the like. In the detailed embodiment of FIG. 24 however, there is a shaft 2 mounted into the rotor hub of rotor 11. Shaft 2 is now the hollow shaft of the motor. It may be provided with inner and outer seat cones 3 and 4 on one end of the shaft. There may further be a flange 5 on the same end and an undercut ring groove 6 therebehind. This is convinient to use this hollow shaft as an operation spindle for a machine tool, like lathe, grinder, milling machine or drill. Respective strong radial bearings 7 are provided on both end portions 8 of the housing, whereby the housing 8 becomes in common a motor housing and a spindle bearing housing. The bearings 7 are accordingly stronger and more precise than they would otherwise be used in a fluid motor. The other end of shaft 2 may be provided with cylindrical and/or plane seats 9 and/or 10.

These seats may be used to mount on axially operating drive means, like for example a cylinder, piston and/or counter acting springs to drive the shaft 2 as a machine tool spindle axially forward and backward within housing 8 and within rotor 11. Respective key means may be added between rotor 11 and shaft 2. In practical applications I am providing this arrangement for the automatic production of piston shoes, bearings, retainers and the like. The shaft 2 is thereby becoming a motor shaft atnd at same time the spindle of a machine tool. It may at same time revolve, carry a working means, like bite, cutter, grinding wheel, revolve it and also move it axially in the respective operation. When the axial drive set has a counter acting spring in combination with a fluid driven piston in a cylinder, the end pressure may define the axial movement of shaft 2 and thereby the depth of the cutting operation. Automatic pressure control may thereby define an automatic deepness of the cutting operation. Housing 8 also has the entrance and/or exit passages 18,19 for the respective fluid, the control port pairs 16,17, the rotor passages 15 and the chambers or cylinders 12 and/or 13 with the displacement means or pistons 14 reciprocating therein or co-operating therewith for the periodic increase and decrease of chambers 12,13.

Figure 25:
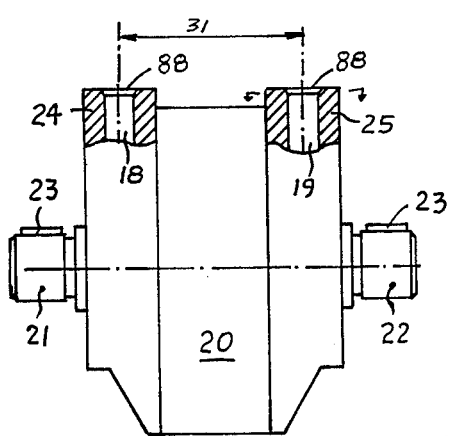
FIG. 25 is a view onto and in part a sectional view through an embodiment.
Figure 26:
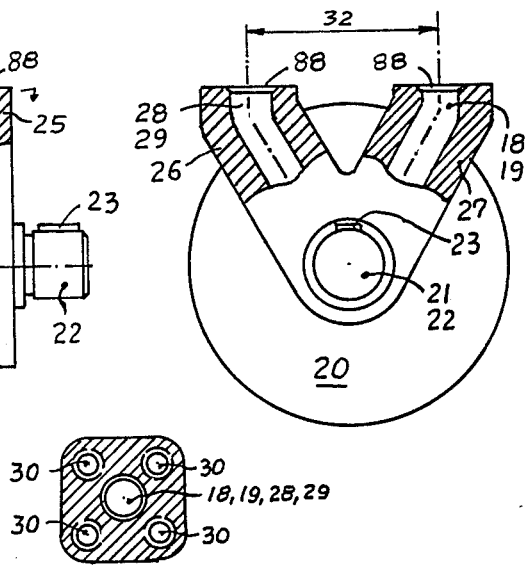
FIG. 26 is a view onto and in part a sectional view through an other embodiment of the invention, with a cross-sectional view therebelow.

FIGS. 25 and 26 are demonstrating and illustrating my "drive- and carry-motor". Here the motor may have in housing 20 a shaft, which extends at one end of the housing 20 or which extends with two ends 21 and 22 instead of only one end 21 out of the respective axial end of housing 20. Instead of having an outwardly extending shaft end, the shaft may also be a hollow shaft as in FIG. 24.

Provided in this embodiment of the invention is a radial and/or axial bearing in the housing which carries more than the load of the respective rotor therein. But which is, in addition, able to carry an outer load. A further feature and embodiment of this arrangement is, that the entrance and exit fluid ports 18, 19 are at least two, but commonly three or four in this motor and that they are extended all in one direction to end in plane and equal faces or in parallel faces 88. Further the said ports 18,19,28,19 are distanced from each other by the respective distances 31 and/or 32. Respective threads 30 are provided around the entrance and exit passages 18,19,28,29 into the respective port portions of the motor. This is shown as sample in the cross-sectional Figure below FIGS. 25 and 26 which is a sectional view along the arrows in FIG. 25.

The arrangement of the strong, multi-loads carrying rotor bearings, as 7 in FIG. 24 into FIG. 25 or 26 in combination with the arrangement of leading the ports into a single direction, for example upwards and let them end in plane faces of equal location in the same plane or parallel in respective planes, makes it possible to use these motors as "drive and carry" motors. They are thereby obtaining the double function of driving the rotational movement of a driven elements and at the same time to carry said element or to be carried by said element.

The plane faces 88 make the easy assembly of the motor onto an even plane face of the respective machine or vehicle possible and they make it also possible and convenient to carry the respective motor 20 on a respective fluid line structure. The distances 31 and 32 add to the stability of the fastening of the motor 20 and thereby add to the capability to carry in addition to drive a rotary movement of an element.

Later Figures in the specification will give a few but only a few samples of applications of the "drive and carry" motors of this embodiment of the invention.

In FIGS. 27 and 29 the drive and carry motor 20 is kept on the fluid pipe structure of the four pipes 33 to 36. The shaft of the drive and carry motor 20 holds and drives a propeller 37. Thereby the motor is used again as a driving motor, meaning as a common fluid drive motor but on the same time as a carry-motor by carrying and holding on its shaft the propeller 37. The propeller may provide a traction or thrust and carry thereby the motor 20. Motor 20 will then carry the pipe structure of pipes 33 to 36, while pipe structure 33 to 36 may then drive or carry a respective vehcile or portion thereof. For example, an aircraft, a helicopter, a boat or a ground borne vehicle.

In FIGS. 29 to 31 the drive and carry motor of FIGS. 25-26 is utilized to drive the wheels of a car or truck and thereby also to carry the body of the car or truck. The pipe structure, which carries the fluid lines to and from the motor(s) 20 is shown by 43 to 45 and the structure may also be a body instead of pipes. However it should include or contain the fluid lines to and from motor(s) 20. In FIGS. 29 and 31 there is a pivot arrangement centered in the pivot axes and bars 42. These also contain fluid lines or portions thereof to and from the motors to communicate to those in the structure 43 to 45. An operation arrangement or a plurality thereof, shown by 39,40 and connecter 41 is provided in these Figures to pivot the wheels 50, 51, which may have tires 49 and the fluid motor(s) 20 into the upwards pivoted end position of FIGS. 29 and 30 and reverse it to the downward pivoted end position of FIG. 31. In FIGS. 29 and 30 the body 38 of the truck is now let down completely to the road or ground 52. Any load can now be moved easily onto the load space 49 above the body 38 over the inclined end face 46 of the body of the truck. In FIG. 31 the body 38,46 is now moved upwards for travel of the truck with the respective speed on the ground, the road or the highway. The motors 20 of these Figures are now fullfilling a number of functions, namely to drive the wheels 50,51 and thereby to drive the car or truck but at the same time also to carry themselves and to carry by them the truck and the load on space 49 of the truck. The pivot arrangement to swing the motors 20 and the wheels 50,51 from the upwards end position into the downward end position is a further embodiment of the invention. In the upward and downward end positions the pivot arrangement may have arresters, to maintain the pivot arrangement 39,40,41, 42,43,44,45 in the respective arrested down or up-position.

In the embodiment of FIGS. 32 and 33 another application of the drive and carry motor is demonstrated. At the same time this embodiment provides a swing axis arrangement for a ground borne vehicle, like a truck or car to reduce the shocks of the body of the vehicle when the vehicle moves over not perfectly even roads or even over rough terrain.

The body 55 of the vehicle is provided with swing holders, which center in the swing pins 59 and 60. Thereon the structures or fluid pipe structures 56 to 58 are borne and they can swing or pivot around the axes of pivot pins 59 and 60. Respective ribs 64 are commonly provided between the pipes or body portions of the structures. At least two fluid lines are provided in the structure to carry fluid to and from the respective motor 20. A third and/or fourth fluid line may also lead fluid to and from the respective motor 20 or it may be a respective blind line with no fluid flowing therethrough. That applies also to the third and fourth fluid lines or pipes of other Figures, for example to FIGS. 27 and 28.

The cross-sectional FIG. 33 which is taken along the line with the arrows of FIG. 32, shows, that there are three fluid lines or pipes 56 to 58 which are respectively distanced from each other in accordance with the similar distances 31 and 32 of FIGS. 25 and 26. The ports of motor 20 are ending here endwards, but again in a single direction and end again here in plane faces 88. The three-pipes arrangement of the structure with the strengtheners 64 and corner strengtheners 68 therebetween give these structures a good capabilty to carry the car or vehicle and its body and its load 55. However in combination with the strong and multi-purpose bearings of the drive and carry motors of FIGS. 25 to 26. On holders provided on the structures are the shock-absorber pins 63 provided. They are connecting the shock absorber arrangement of absorber body 61 and absorber pistons 62 to the structures 56 to 57 on both sides of the vehicle. When the car or truck runs over uneven ground and a shock is respectively appearing onto the wheels 53,54, the shock limitation apparatus 61-62 gives way, which means, that it elongates. The wheels 53,54 are swinging or pivoting then upwards on the structures 56 to 58. When the shock reduces, the shock reducers 61,62 contracts and forces the wheels 53,54 with the motors 20 on the structures 56 to 58 downwards again in a reversed direction of the pivoting or swinging.

What is claimed, is:

1. A device to drive a rotor of a fluid motor to revolve, to carry a body by said motor and said motor to be carried by said body respectively;
    wherein said device consists of a fluid pump, a fluid line from said pump to said motor and a structure,
    wherein said structure includes a pipe to form said fluid line,
    wherein said motor includes said rotor revolvably borne in bearings in a housing, fluid ports on said housing and passages from said ports to working chambers which are provided in said rotor and revolve said rotor when fluid is pressed into and through said chambers,
    wherein said structure consists of at least three pipes which are substantially parallel to each other and which are fastened to each other by ribs between said pipes while one of said pipes is placed laterally of the two other pipes of said structure,
    wherein one of said pipes of said structure forms said fluid line to pass a pressurized fluid flow from said pump through said pipe to at least one port of said ports of said motor,
    wherein the distances between the axes of said pipes of said structure are larger than the outer diameters of said pipes,
    wherein said structure forms an inner end and an outer end with said inner end fastened at least indirectly to said body while said outer end forms a holding portion with said pipes and is provided with at least one plane face which is substantially perpendicular to said axes of said pipes while a bore extends through said holding portion to communicate said fluid line with said plane face and to port said fluid line to said plane face,
    wherein said holding portion and said plane face form at least three holding places whereof one is laterally distanced from two others of said holding places,
    wherein said fluid ports of said motor are extended in one single direction, are laterally distanced from each other and port into at least one plane housing face of said housing which is substantially perpendicular to the axes of said ports of said motor,
    wherein said plane housing face includes at least three fastening places whereof one is laterally distanced from two others of said fastening places and two of said fastening places are provided in the neighborhood of ports of said motor, whereby said fastening places form the mirror image of said holding places of said plane face of said holder of said structure; and;
    wherein said plane face of said holding portion of said structure is fastened to said plane housing face of said motor at said at least three fastening places,
    whereby said fluid line to pass said pressurized fluid is communicated from said pump through said structure, one of said holding places and one of said fastening places directly to the respective port of said ports of said motor,
    while said structure thereby fulfills the plurality of functions of forming a fluid line and of holding a motor and said motor fulfills the plurality of functions of revolving a member which is fastened to the shaft of the rotor of said motor and of carrying a load,
    whereby said device respective to said body and remote of said body is able to drive and to carry a revolvable member on the shaft of said motor and thereby to carry said body and to drive the movement of said body.

2. The device of claim 1,
    wherein said inner end of said structure is provided with a swing member which has an axis which is substantially normal to the axes of said pipes of said structure and substantially parallel to the direction of movement of said body,
    wherein said device constitutes a first device while a second device which is substantially equal to said first device is paired to said first device to connect a pair of such devices to said body, wherein said second device forms the mirror image of said first device with the swing member of said second device located parallel to the said swing member of said first device and both of said swing members located substantially parallel along the medial axis of movement of said body with said axis of said first swing member parallel to the axis of said second swing member, wherein said member which is fastened to said shaft of said rotor of said motor is a wheel and both motors of both devices are provided with one of said wheels on the respective shaft of the respective rotor of the respective motor, and, wherein said structures of said devices are inclined slightly downwardly from said body to hold said motors in locations substantially below said body and laterally of the imagined axis of movement of said body, while said structures are provided with shock absorber fastening places which hold at least indirectly the ends of a traction spring of a shock absorber between said shock absorber fastening places whereby said traction of said spring tracts said motors downwards and thereby decreases the angle of inclination between the axes of said pipes of said first and second structure of said pair of devices while the weight of said body provides an oppositionally directed force to said spring which opposes said traction of said spring of said shock absorber, whereby said body swings up and down and said angle between said axes of said pipes of said first and second device of said pair of devices increases and decreases when said body runs as a vehicle over uneven terrain.

* * * * *